3,504,035
PROCESS FOR PREPARING AROMATIC AMINES FROM AROMATIC NITRO COMPOUNDS
Leon Myron Polinski, North Plainfield, N.J., and Ernest Albert Harvey, Franklin, Va., assignors to American Cyanamid Company, Stamford, Conn., a corporation of Maine
No Drawing. Filed July 1, 1966, Ser. No. 562,099
Int. Cl. C07c 85/10
U.S. Cl. 260—580                    9 Claims

ABSTRACT OF THE DISCLOSURE

Aromatic nitro compounds are converted to corresponding aromatic amine compounds by contacting, under defined reaction conditions, a reaction mixture consisting of vaporized aromatic nitro compound, water vapor and a lower gaseous alkane, with a catalyst consisting of an intimate mixture of reforming and hydrogenation catalysts. A specific example is the conversion of nitrobenzene to aniline using a catalyst consisting of (a) 20% nickel on silica as reforming catalyst and (b) 12% copper on silica as hydrogenation catalyst.

---

The present invention relates to a novel preparation of aromatic amines from aromatic nitro compounds. More particularly, it relates to an improved process for the vapor phase conversion of aromatic nitro compounds to corresponding aromatic amines. Still more particularly, the invention is concerned with the vapor phase reduction of aromatic nitro compounds utilizing a novel mixed hydrogenation-reforming catalyst.

The reduction of aromatic nitro compounds to recover amines therefrom is well known in the art. This is usually accomplished by one of two techniques. In one method, reduction is carried out in the liquid phase, employing iron borings and water in the presence of an acid. The other method for accomplishing reduction is to pass an aromatic nitro compound in the vapor phase and hydrogen over or through a suitable hydrogenation catalyst. Unfortunately, neither of these techniques appears to be wholly satisfactory. For instance, the liquid phase reduction reaction results in large formations of sludge from which resultant aromatic amines are difficult to remove. In conventional vapor phase reactions, the provisions of hydrogen per se markedly increases costs for both reactants and equipment. Further, in early vapor phase reactions, hot spots usually tended to develop in the reactor, due apparently to improper contact of vapors on the catalyst, resulting in violent explosions. If a process for the conversion of aromatic nitro compounds to their corresponding amines which is substantially safe and economical could be provided, such a process would fill a long-felt need.

It has been found in accordance with this invention that difficulties of the prior practices can be obviated by use of a one-step vapor phase reforming-reduction procedure. This involves the passage of a mixture of an aromatic nitro compound, water vapor and a lower alkane in the vapor phase either over or through an intimate mixture of a reforming catalyst and a hydrogenation catalyst. In so proceeding, hydrogen is produced at the same time and in the same place as it is used to reduce the nitro compound to the desired amine compound, thus obviating the need and cost of a separate hydrogen-producing facility. The reaction conditions for supplying hydrogen are much less severe than those used in conventional reforming procedures. Thus, whereas temperatures of greater than 900° C. are usually required to produce hydrogen by a reforming reaction, the present invention accomplishes this objective with temperatures below about 500° C. Moreover, since hydrogen is immediately used as it is formed, this lessens the danger of explosion associated with hydrogen storage facilities. This "instantaneous" use of the hydrogen is probably the reason that hydrogen can be produced at all at temperatures of below 500° C. as contrasted to the normal requirement of temperatures in excess of 900° C. It is also noteworthy that by combining two reactions which are exothermic and endothermic, there is a saving of heating and cooling equipment and the power required to operate the same.

The overall reaction of the present invention can be graphically represented as follows:

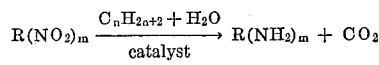

$$R(NO_2)_m \xrightarrow[\text{catalyst}]{C_nH_{2n+2} + H_2O} R(NH_2)_m + CO_2$$

wherein R is an aromatic carbocyclic moiety of one or two rings and m and n are each an integer from 1 to 3. It is a good practice to maintain the temperature of reaction from about 200° to 500° C., and preferably, from 250° to 350° C., under either atmospheric pressure or slightly higher.

In general, a large variety of aromatic nitro compounds may be converted by the process of this invention. Exemplary of the useful compounds are o-nitrobenzene, p-nitrobenzene, o-nitrotoluene, o,p-dinitrobenzene, o,p-dinitrotoluene, o-nitrophenol, p-nitrophenol, o-nitrochlorobenzene, p-nitrobromobenzene, nitrodiphenyl, α-nitronaphthalene, α,β-dinitronaphthalene, o,m,p-trinitrobenzene, o-, m-, or p-nitroanisole. Though the invention will be described further as applied to the production of aniline from nitrobenzene, it will be understood that this invention is equally applicable to the several nitroaromatic compounds enumerated above.

As the lower alkane, there may be used methane, ethane or propane. About one to five moles should be used per mole of aromatic nitro compound. Mixtures of these alkanes are also contemplated. Gaseous alkanes derived from natural gas or refinery gas can be employed as such without subjecting them to prior purification.

In the process of the invention both water and the defined catalyst system play critical roles. Water is required because it reacts with the alkane to form hydrogen in situ. Further, steam tends to extend the life of the catalyst by preventing its inactivation due to carbon formation thereon. Usually from 2 to 20 moles of water vapor per mole of aromatic nitro compound should be employed.

The catalytic system comprises two principal, intimately mixed components. One is a reforming catalyst and the other is a hydrogenation catalyst. As the reforming catalyst there may be named noble metals, e.g., platinum and compounds of metals such as nickel, iron and chromium. These may be employed as such or associated with promoters. The latter are alkali metal oxides or carbonates, e.g., sodium oxide, potassium oxide, sodium carbonate or potassium carbonate. Further, the catalysts are usually deposited on suitable substrates such as clay, silica, alumina, ferric oxide or magnesium oxide.

Useful hydrogenation catalysts are those which are effective for the conventional vapor-phase reduction of aromatic nitro compounds. These generally consist of copper deposited on a porous mineral support. Useful hydrogenation catalysts are disclosed in U.S. Patents 1,207,802 (Schmidt), 1,937,728 (Storch), 2,034,077 (Arnold), 2,258,786 (Melaven) and 2,891,094 (Karkalits). The best hydrogenation catalysts for use in this invention are those disclosed in the Karkalits patent, particularly Examples 1 and 2 thereof.

As stated previously, an intimate mixture is of prime importance in the process of the invention. To achieve intimate admixture, one of several techniques may be employed. One method is to co-precipitate both types of catalysts on a common substrate or carrier. Another method is to co-impregnate or consecutively impregnate the two types of catalysts on the same inert carrier. Still another method involves the preparation of individually impregnated catalysts on the same or different inert carriers. The latter may then be wet or dry blended or admixed. Alternatively, the individual catalysts may be finely ground prior to blending, intimately mixed and tableted either with or without a binder. In either process employed, the ratio of the catalysts may vary in the range of 10% to about 90% of reforming catalyst, the balance being the hydrogenation catalyst. A good operating mixture comprises about 50% reforming catalyst and 50% hydrogenation catalyst.

In general, the reactants can be passed over the catalyst at a space velocity of between about 50 volumes and 1000 volumes per volume of catalyst per hour. A contact time between reactants and catalyst ranging from 1 to 10 seconds is sufficient to effect the desired conversion of the aromatic nitro compound.

The invention will be illustrated in conjunction with the following examples, which are to be taken as illustrative only and not by way of limitation. All parts and percentages are by weight unless otherwise stated.

EXAMPLE 1

This example illustrates the formation of an intimately mixed reforming-hydrogenation catalyst. As the reforming component of the catalyst system, nickel deposited on a silica support in an amount sufficient to provide 20% nickel oxide is used. The hydrogenation component of the catalyst system consists of 12% copper on a silica support.

A catalyst bed 4" long is packed in a tube of 1" diameter. The catalyst is formulated in the following manner: 50 parts Cyanamid NR-1 reforming gas catalyst (nickel on a support) are ground in a ball mill to particles of less than 100 mesh. Cyanamid Catan catalyst (12% copper on a silica support) is obtained in less than 100 mesh particles and 50 parts are mixed as homogeneously as possible with the reforming catalyst. The mixed catalysts are combined with a compounding agent (about 5 parts of stearic acid) and tableted in a machine into 4-6 mesh pills. The pills are calcined in situ in the reactor by (a) burning off the compounding agent in hot air followed by (b) treatment with hydrogen to reduce any copper oxide which may be present to metallic copper.

In lieu of the above-named reforming catalyst, there can be advantageously substituted any of the following diverse catalysts.

(a) 0.1% to 1% platinum supported on alumina in the presence of from 2% to 7% potassium carbonate as a promoter;

(b) An iron-based catalyst containing approximately 93 parts of ferric oxide, 5 parts of chromium oxide and 7 parts of potassium carbonate and heated to between 800° C. and 950° C.;

(c) Alumina-chromia catalyst promoted with potassium oxide, prepared from 8% chromium oxide, 1-2% potassium oxide and the balance being alumina;

(d) Zinc oxide-based catalyst containing 7.6% alumina, 4.7% to 9.4% calcium oxide, 0% to 4.7% magnesium oxide, 2.8% potassium chromate and 2.8% potassium sulfate;

(e) Magnesium oxide catalyst containing 18.4% ferric oxide, 4.6% calcium oxide and 4.6% potassium oxide; and (f) Nickel calcium phosphate catalyst corresponding to the structure $Ca_8Ni(PO_4)_6$ stabilized with chromic oxide.

Catalysts so prepared are highly effective in the vapor phase conversion of an aromatic nitro compound to the corresponding amine in the presence of a lower alkane and steam.

EXAMPLE 2

The catalyst prepared in accordance with the procedure of Example 1 (44 grams) is packed in a 1-inch tube to give a bed about 4" long, and the bed is hydrogenated to reduce any copper oxide which is present. The tube is heated to a temperature of 327° C. There is then introduced into the tube, maintained at about 327° C., a mixture of nitrobenzene, methane and water vapor. This mixture is reacted in the vapor phase over the catalyst bed while maintaining a feed rate of 39 cc. of liquid nitrobenzene per hour, 81 cc. of gaseous methane per minute, and 49 cc. of water per hour for a total of 3 hours. An average contact time of the reactants over the catalyst for from 2 to 5 seconds is maintained.

The reaction product is collected in a suitable receiving flask cooled by an ice bath. Condensed reaction products amount to about 104 grams, analyzing about 32.2% aniline, 63.9% nitrobenzene and 3.5% of unidentified products. The conversion of nitrobenzene is about 50% and the aniline over-all yield is about 73% of theory, based on the converted nitrobenzene.

EXAMPLE 3

Upon completion of the reaction in Example 2, above, the catalyst bed is calcined in hot air so as to burn off the carbon and then heated with hydrogen to revitalize the catalyst.

The procedure of Example 2 is repeated except that the catalyst is heated and maintained at a temperature of 350° C. while passing thereover for a total time of 2.5 hours, a mixture of nitrobenzene, water and methane at rates equal to 39.2 cc. per hour of liquid nitrobenzene, 41.6 cc. per hour of water and 81 cc. per minute of gaseous methane.

There is collected in an ice-cooled receiving flask about 89% of the reaction product. On separation and subsequent analysis, 34.2% aniline, 61.5% nitrobenzene and 4.3% of unidentified compound are obtained during the over-all conversion procedure. The aniline yield is calculated as 72% of theory, based on the converted nitrobenzene.

In the above example, similar results are noted when ethane or propane is substituted for methane and when nitrodiphenyl or nitronaphthalene is substituted for nitrobenzene.

We claim:

1. A method for the vapor phase conversion of an aromatic nitro compound to the corresponding aromatic amine compound which comprises: contacting a reaction mixture consisting of a vaporized aromatic nitro compound, water vapor and a lower gaseous alkane of from one to three carbon atoms with an intimately admixed catalyst consisting of a reforming catalyst and a hydrogenation catalyst, at a temperature between 200° C. and 500° C. and a space velocity of between about 50 volumes and about 1000 volumes per volume of catalyst per hour, cooling the resultant reaction mixture and recovering the aromatic amine; the mole proportion of water vapor to aromatic nitro compound in said reaction mixture being between 2 to 1 and 20 to 1 and said admixed catalyst containing from 10% to about 90% of reforming catalyst.

2. The process according to claim 1 wherein the hydrogenation catalyst is 12% copper on a silicaceous support.

3. The process according to claim 1 in which the aromatic nitro compound is nitrobenzene.

4. The process according to claim 1 in which the lower alkane is methane.

5. The process according to claim 1 in which the temperature of reaction is maintained at between about 250° C. and about 350° C. for a time ranging from about one second, but not exceeding about ten seconds.

6. The process according to claim 1 in which the reforming catalyst is 20% nickel on silica and the hydrogenation catalyst is 12% copper on silica.

7. The process according to claim 1 in which the reforming catalyst is platinum on alumina activated by potassium carbonate and the hydrogenation catalyst is 12% copper on silica.

8. The process according to claim 1 in which the dehydrogenation catalyst is reduced ferric oxide, reduced chromium oxide and potassium carbonate and the hydrogenation catalyst comprises 12% copper on silica.

9. A process according to claim 1 wherein the dehydrogenation catalyst is a zinc oxide catalyst containing calcium oxide, magnesia, alumina, potassium chromate and potassium sulfate and the hydrogenation catalyst comprises 12% copper on silica.

References Cited

UNITED STATES PATENTS

| | | | |
|---|---|---|---|
| 2,118,001 | 5/1938 | Andrews et al. | 260—580 |
| 2,823,235 | 2/1958 | Graham et al. | 260—580 |

FOREIGN PATENTS 705,919  3/1954  Great Britain.

CHARLES B. PARKER, Primary Examiner

RICHARD L. RAYMOND, Assistant Examiner

U.S. Cl. X.R.

252—437, 454, 459, 465, 466, 470, 473; 260—575